Mar. 27, 1923.
H. K. NAJARIAN.
CONTINUOUS VACUUM FILTER.
FILED JULY 30, 1920.
1,449,774.
3 SHEETS—SHEET 2.
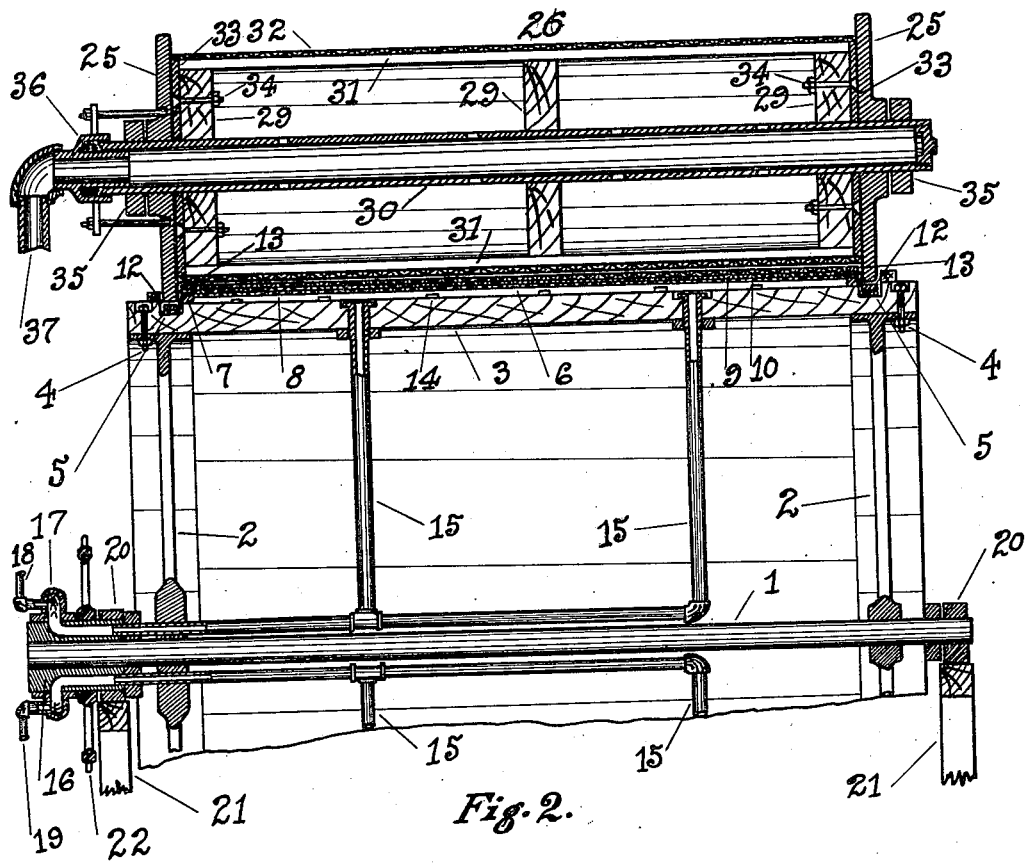
Fig. 2.
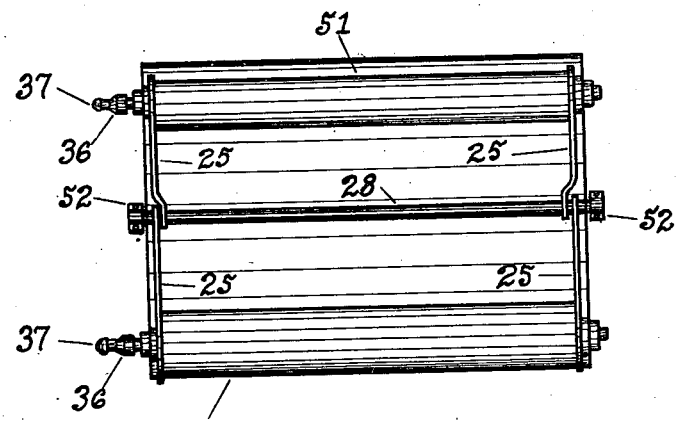
Fig. 3.
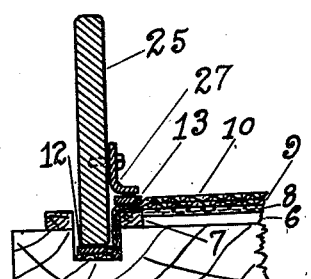
Fig. 4.
INVENTOR
Herand K. Najarian
BY
ATTORNEY

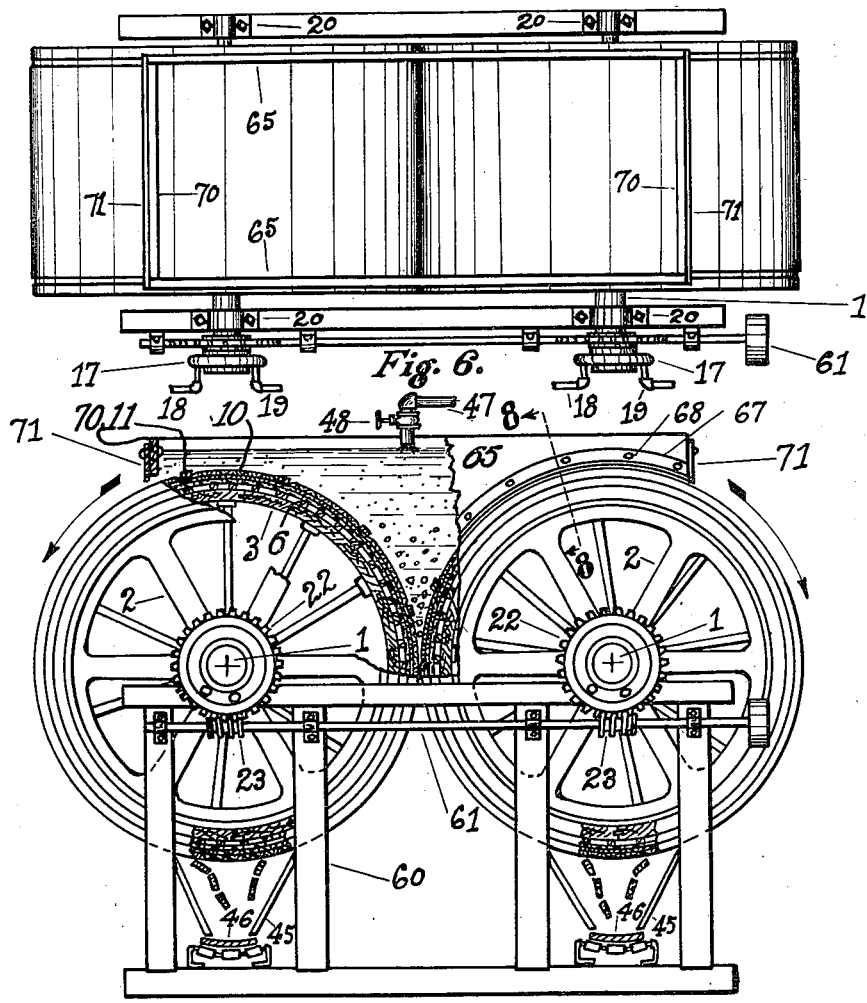
Fig. 6.
Fig. 7.
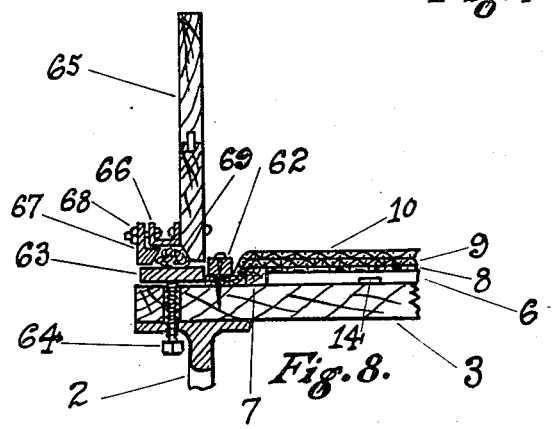
Fig. 8.
INVENTOR
Herand K. Najarian
BY
ATTORNEY

Patented Mar. 27, 1923.

1,449,774

UNITED STATES PATENT OFFICE.

HERAND K. NAJARIAN, OF SALT LAKE CITY, UTAH.

CONTINUOUS VACUUM FILTER.

Application filed July 30, 1920. Serial No. 400,229.

*To all whom it may concern:*

Be it known that I, HERAND K. NAJARIAN, a citizen of the United States, residing at Salt Lake City, county of Salt Lake, and State of Utah, have invented certain new and useful Improvements in Continuous Vacuum Filters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention, as hereinafter described, relates to continuous vacuum filters, in which a rotating drum, carrying on its periphery a filter medium, is so constructed and operated as to immerse the said filter medium, for a part of each revolution, in a tank situated above the horizontal center line of said rotating drum and containing pulp to be filtered, the periphery of the said rotating drum forming part of the said tank containing the pulp. The said filter medium, during its immersion in the said pulp, travels through the body of the pulp, beginning at a deep or the deepest point and moving towards the surface of the said body of pulp; and thence, either emerging from the surface of the pulp, or, in its further forward travel moving again toward and through a deep part of the pulp. During this immersion the liquid component of the said pulp is drawn through the filter medium by suction, and the solid component, hereafter called the cake, clings to the surface of the filter medium.

The said filter medium, after emerging from the said body of pulp and carrying on its surface the clinging cake, can be submerged in a tank containing wash water or any treating solution or pulp to be filtered, said tank being situated above the horizontal center line of said rotating drum, and the periphery of said rotating drum forming a part of said tank. The filter medium which carries on its surface the said cake, is immersed in the said tank containing wash water or treating solution or pulp to be filtered, and said wash water or treating solution or the liquid component of the said pulp is drawn through the interstices of the said cake and through the filter medium by suction. The cake clinging to the surface of the said filter medium after emerging from the said tanks is forced off the filter medium by direct air pressure. The point of delivery of this cake is preferably when it reaches the lowest point of its travel, so that its weight assists the air pressure in clearing the cake from the filter medium.

During the submergence of the said filter medium in the pulp, wash water, or any treating solution contained in the said tanks, the said filter medium is subjected to hydraulic pressure, said pressure being created by the weight of the pulp, wash water, or any other treating solution contained in the said tanks. The hydraulic pressure thus created forces the liquid component of the pulp, or the wash water, or other treating solution through the interstices of the filter medium.

My filter is particularly adapted for the continuous removal of water or cyanid or other solution from ore, tailings, slime, sand, concentrates, precipitates or mixtures of same, in which connection I shall hereinafter describe it. It is also adapted for separating any solid or insoluble material from its containing fluid, as for example, crystallized substances from the mother liquor; crystallized sugar from its syrup; wood-pulp, paper, etc., from water; mud, clay, or any solid or semi-solid or insoluble substances from water, or other liquid for the purpose of clarification of the liquid or for the removal of said substances.

In this specification the terms "suction," "vacuum," "pulp," "cakes," etc., are used in their broadest meaning as employed in the present day filter practice.

The objects of my invention are: first, to produce a filtering machine that will be low in cost; second, to reduce the cost of repairs and renewals to minimum by eliminating the causes of wear and tear, such as the mechanical scrapers; third, to make the thickness of the cake that can accumulate on the filter medium a maximum, so as to obtain large capacity; fourth, to reduce the time necessary for the elimination of liquids from the pulp, or washing of the cake, to a minimum.

My filter is constructed either as a single-drum type, having one main drum carrying on its periphery a filter medium, or as a duplex-type, having two main drums each carrying a filter medium on its periphery.

Referring to the accompanying drawings for a more complete explanation of my filter, Fig. 1 is a view partially in end elevation and partially in cross-section, showing my single-drum type filter.

Fig. 2 is a partial longitudinal section of same taken on line 2—2 of Fig. 1.

Fig. 3 is a plan of the single-drum type filter on a smaller scale.

Fig. 4 is a section taken on line 4—4 of Fig. 1, showing an end wall, looking in the direction of the arrows.

Fig. 5 is a section showing a side wall, which may be substituted for the side rollers.

Fig. 6 is a plan of my duplex type filter.

Fig. 7 is an end view of same partly broken away.

Fig. 8 is a section taken on line 8—8 of Fig. 7, looking in the direction of the arrows, showing an end wall.

Figure 1:
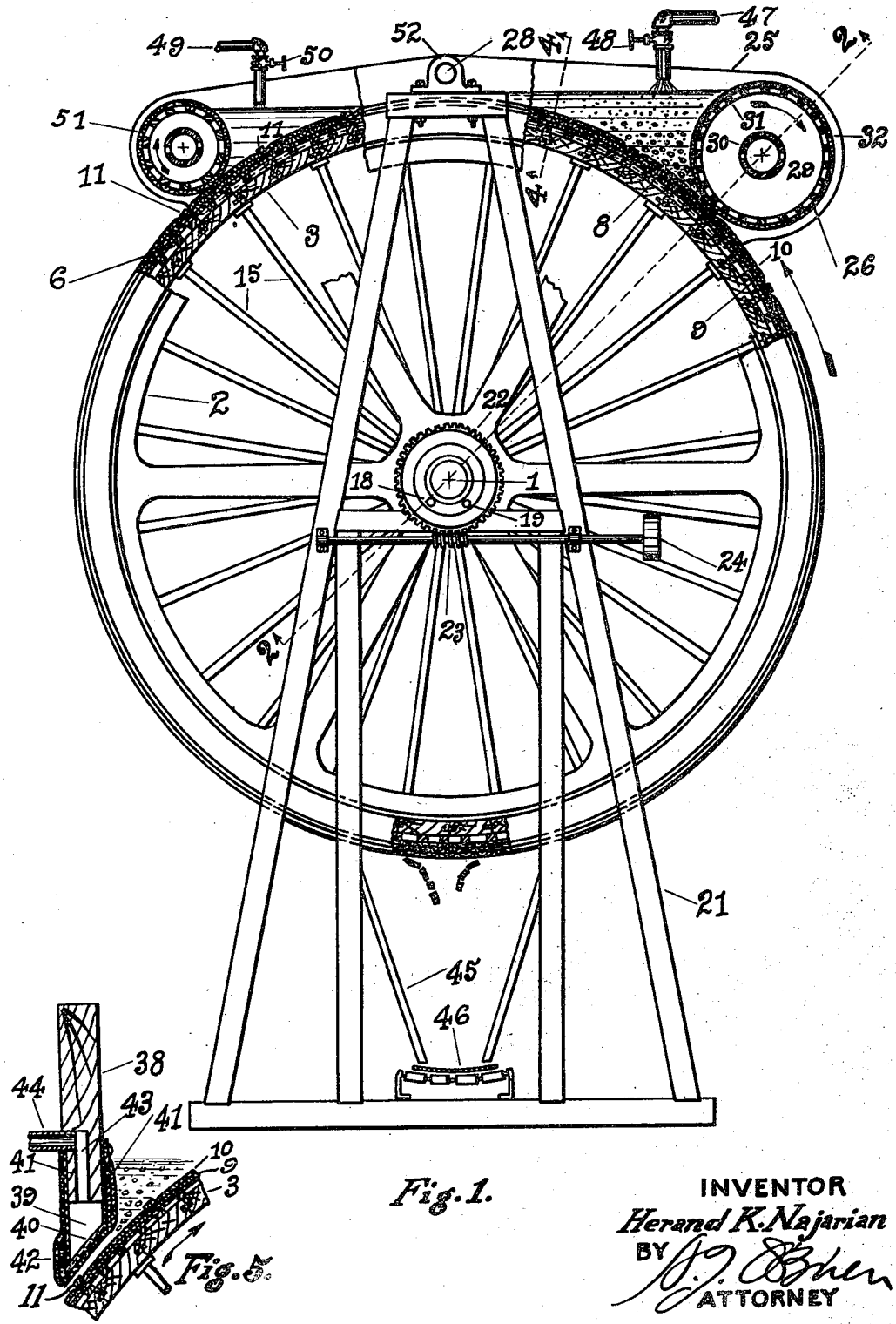

The drawings show a shaft 1 of suitable size, on which narrow faced pulleys or heads 2 are mounted and secured. Wooden staves 3 are bolted to the periphery of the pulleys 2 by bolts 4, the joints between the wooden staves being made water- and air-tight. The pulleys 2 and staves 3 mounted on shaft 1, as described, constitute the filter drum. It should be noted that the filter drums in the two types are substantially identical in construction.

On the outer surface of the staves 3, forming the periphery of the filter drum, are laid slats of wood 6 (Figs. 1, 2, 4 and 8), at an angle to the axis of the drum and fastened to the surface of the staves and having notches 14 cut in them at intervals. End pieces 7 are then laid at the ends of slats 6 in a plane perpendicular to the axis of the drum. On top of slats 6 is laid wire cloth 8 of a resistant material, the top of the wire cloth being flush with the top of end pieces 7. On top of wire cloth 8, and projecting beyond the end pieces 7, is laid a layer of burlap 9, and on top of the burlap is laid a layer of canvas 10, both in section, the burlap and the canvas forming the filter medium. The projecting ends of the burlap and the canvas are fastened to the surface of the wooden staves in various ways, depending upon the construction of the water-tight joint between the lower edge of the end walls 25 and 65, as for instance, by wearing strips 12 and 13 (Fig. 4) or by ring 62 (Fig. 8).

The filter medium is divided into a number of rectangular sections by strips 11, laid parallel to the axis of the drum at intervals and fastening said medium to the slats 6. Thus a number of chambers, each equal in width to the distance between strips 11, is formed between the filter medium and the outer surface of the periphery of the filter drum formed by staves 3. Each one of these chambers is connected by pipes 15, to a passageway in a head casting 16, said passage-ways opening radially into the port casting 17, the number of these passage ways being the same as the number of sections into which the filter medium is divided. The head casting 16 and the port casting 17 constitute the pressure-control valve, the port casting 17 having two separate ports communicating independently with sources of suction and pressure by pipes 18 and 19 respectively.

The drum shaft is mounted on bearings 20, which in turn are carried on a suitable structure 21 in the single-drum type filter, and structure 60 in the duplex-type filter. Rotation is imparted to the filter drum by any suitable means, as for instance by worm gear 22, worm 23, and drive shaft and pulleys 24 (Fig. 1) and 61, (Fig. 7).

In my filters the tanks which hold the pulp to be fed onto the filter medium and the tanks which hold the wash water or any other treating solution are always situated above the horizontal center line of the filter drum and are constructed in various ways, depending on the consistency of the pulp and other governing conditions. Referring to Figs. 1, 2 and 3, the pulp tank is formed by roller 26, and two end walls 25, and the wash tank is formed by roller 51, and the two end walls 25, the construction of rollers and end walls being in each case substantially identical. The walls 25 are hinged on rod 28 carried by bearings 52 on framework 21. The rollers 26 and 51 are formed by discs 29 mounted on and fastened to hollow shaft 30, having a number of openings or notches on its periphery receiving the ends of longitudinal slats 31, and canvas 32 fastened to said slats 31, and forming the periphery of the drum. The hollow shaft carrying the roller is mounted on the end walls 25 and rotatable on it. Friction discs 33 bolted to end discs 29 afford wearing surfaces between the ends of the roller and the end walls. One end of the hollow shaft 30 is closed, the other being connected through a stuffing box 36 to a pipe 37, through which air or steam or any other gas or liquid can be admitted into the roller under pressure. The periphery of the roller is in contact with the surface of the filter medium, or set at such a distance from it that the pulp will not leak through the space between the periphery of the roller and the surface of the filter medium.

The side wall, instead of being in the form of roller 26 or roller 51, may be a solid wall 38 (Fig. 5) having at its lower end a chamber formed by plates 41, wire cloth 40, covered with canvas 42, said chamber being connected to a pipe 44, by opening 43, through which pressure can be maintained in the chamber.

The joints between the end walls 25 (Figs.

3 and 4) and 65 (Figs. 6 and 8), and the filter drum, are so constructed as to prevent the leakage of pulp or wash water or any treating solution from the containing tanks, as for example by a flexible flange 27 (Fig. 4) fastened to the end wall 25 and bearing on wearing strip 13, or by a stuffing box bearing against a ring 63 set on the periphery of the drum and held in place by set screws 64, the stuffing box consisting of an annular channel 66 (Fig. 8) fastened to end wall 65, and having a flange 67 retaining packing 69 and bolted at 68 to channel 66.

In my duplex-type filter the two filter drums are set so that their axes are substantially parallel and the space between the surfaces of the filter mediums carried on the periphery of the drum is made small enough to prevent the leakage of the pulp contained in the tank. The tank, as clearly shown in Figs. 7 and 6, is formed by part of the periphery of each filter drum, side walls 70 and end walls 65. A regulating strip 71 is fastened to the side wall to regulate thickness of cake and to prevent leakage. The two filter drums are carried on a suitable structure 60.

The operation of my filter is as follows:

In my single-drum type filter, the pulp is fed into the tank formed by roller 29, end walls 25, and part of the periphery of the drum, through the pipe 47 and regulating valve 48. The filter drum is rotated in the direction of the arrow, Fig. 1. Compressed air or steam is admitted into the roller 26, through the hollow shaft 30, inflating the canvas periphery, which touches the surface of the filter medium on the drum, thus by contact imparting the rotation from the filter drum to the roller. The leakage of air or steam through the canvas periphery of the roller prevents the solid particles in the pulp sticking to the surface of the roller.

In my duplex type filter the pulp to be filtered is fed through pipe 47 and control valve 48, at any desired rate, into the pulp tank formed by a part of the periphery of each filter drum, the side walls 65 and end walls 70. The filter drums are rotated in the direction of the arrows (Fig. 7), the filter medium passing through the pulp, beginning from the deepest part towards the surface and cake, emerging from the tank by passing under the regulating strips 71 and on reaching the most convenient location for its discharge, as for instance when it faces vertically downwards, is discharged off the surface of the filter medium by direct air pressure applied through the filter medium.

In pulps whose solid component is composed of various sizes, such as concentrates, sands, etc., the larger particles naturally sink to the bottom of the tank faster than the finer particles, and as the filter medium always moves in the pulp tank from the deepest part towards the surface of the body of the pulp, it is evident that the coarse particles in the pulp are deposited on the surface of the filter medium before the finer particles come in contact with the surface of the filter medium. This is a decided advantage, as the coarse particles deposited on the surface of the filter medium prevent the finer particles from clogging the interstices of the filter medium and furthermore, act in themselves as a filter medium.

As the filter medium passes through the body of the pulp, the liquid component of the said pulp is drawn through the interstices of the filter medium, both by the action of suction and gravity within the pipes 15 and chambers under the filter medium, and by the action of hydraulic head obtained by the depth of the body of the pulp in the tank. The liquid component of the pulp or the wash water or any treating solution contained in the wash tank is drawn through the accumulated cake on the surface of the filter medium, then through the interstices of the filter medium, through the chambers under the filter medium, through pipes 15, through passageways in head casting 16 (Fig. 2), into the suction port in port casting 17, passes out through the pipe 18, and is disposed of by suitable means. The cake clinging to the surface of the filter medium is forced off the surface of the filter medium by admitting compressed air into the chamber underneath the filter medium, at any desired position, as for example, when the cake is facing vertically downwards as shown. The cake thus forced off the surface of the filter medium falls away by gravity and is disposed of as desired, as for example, carried away by a conveyor 46 under hoppers 45. The compressed air is admitted to the chambers underneath the filter medium through pipe 19, opening into compression port in port casting 17, thence through the passageway in head casting, thence through pipes 15.

When the simplex type is employed, the cake on the filter drum 2 may be passed through the wash or treating compartment formed by roller 51 and sides 25, into which water or solution is introduced through pipe 49 by valve 50. Obviously such compartments may be used also with a duplex structure.

I claim:

1. In a continuous vacuum filter, the combination of a rotating drum, carrying on its periphery a filter medium, a pulp feed tank and a wash water or treating solution tank situated one on each side of the vertical diameter of said drum, both of said tanks being situated above the horizontal center line of said rotating drum, the periphery of said rotating drum forming a part of both said pulp feed tank, and the wash water or treating solution tank.

2. In a continuous vacuum filter of duplex type, the combination of two rotating drums of substantially equal diameters supported separately and having their several axes substantially parallel to each other, and each rotating drum carrying a filter medium, on its periphery, said mediums engaging each other, and the upper adjacent parts of said peripheries forming a part of a pulp tank situated above the horizontal center line of said rotating drum.

3. In a continuous vacuum filter, a wash water or treating solution tank formed by part of the periphery of a rotating drum and a roller rolling on the surface of the cake carried on the filter medium on the periphery of said rotating drum, and end walls contacting with the ends of the roller and the surface of the drum.

4. In a pulp tank formed by a part of the periphery of a rotating drum, a roller rolling on the surfaces of the filter medium carried on the periphery of the drum, and two end walls, said roller having a hollow shaft and a porous surface and being inflatable by pressure from within the roller.

5. A tank formed by a part of the periphery of a rotating drum having a filter medium thereon, a roller rolling on the surface of the cake carried on the filter medium on the periphery of the drum, and two end walls, said roller having a hollow shaft and a porous surface and being inflatable from within the roller.

6. In combination, a rotary filtering drum provided with a filter surface, end walls at the ends of a portion of the drum, above the horizontal center line thereof, said walls extending upward from the drum, joints between said walls and the surface of the drum to prevent leakage, and means at the outer ends of said walls and contacting with the drum to prevent leakage, whereby a receptacle is produced by said drum portion, said walls and said means.

7. In combination, a rotary filtering drum provided with a filter surface, end walls at the ends of a portion of the drum, above the horizontal center line thereof, said walls extending upward from the drum, joints between said walls and the surface of the drum to prevent leakage, and means at the outer ends of said walls and contacting with the drum to prevent leakage, whereby a receptacle is provided by said drum portion, said walls and said means, said means comprising a rotary member positioned with a portion of its surface above said horizontal line.

8. A machine for separating liquids from solids and for washing and saturating solid materials with liquids, comprising a cylindrical drum carrying a filter medium thereon, means for spacing said filter medium from said drum, said means dividing said space into a plurality of separated chambers, means for connecting said chambers separately to a pressure control valve, and means for producing suction in some of said chambers and for simultaneously introducing fluid under pressure into others, a pulp tank situated above the horizontal center line of said drum and formed by portions of the periphery thereof, a cylindrical roller whose surface contacts with the drum surface and rolls thereon as the drum rotates, and end walls contacting with the surface of said drum and the ends of said rollers, means for rotating said drum, means for applying a suction to the chambers which are beneath the pulp, whereby the liquid component of the pulp is drawn through the filter medium by the combined action of the suction and the hydrostatic pressure of the pulp, and means for releasing the cake clinging to the filter surface on the lower side of the drum.

9. A machine for separating liquids from solids, and for washing and saturating solid materials with liquids, comprising a cylindrical drum, a plurality of substantially parallel spacing members on the outer periphery thereof, a filter medium on said drum and spaced therefrom by said members whereby separate communicating chambers are formed, means for connecting said chambers successively to a means for producing a suction and to a supply of fluid under pressure, a pulp tank situated above the horizontal center line of said drum and to one side of the vertical center line thereof, said tank being formed by a portion of the periphery of said drum, end walls contacting with the outer surface of said drum, and a member joining the end walls and contacting with said drum, means for preventing leakage of pulp between the tank walls and the drum surface, said chambers being subjected to suction while they form one surface of said tank, and to pressure at some point in the path between said tank.

In testimony whereof I affix my signature.
HERAND K. NAJARIAN.